3,271,391
PROCESS FOR THE PREPARATION OF ω-(Δ⁴-ANDROSTENE - 16β - OL - 3 - ONE - 16α - YL) PROPIONIC ACID AND INTERMEDIATES FORMED THEREIN
Daniel Bertin, Montrouge, and Jacques Perronnet, Paris, France, assignors to Roussel-Uclaf, S.A., Paris, France, a corporation of France
No Drawing. Filed Apr. 11, 1963, Ser. No. 272,244
Claims priority, application France, Apr. 18, 1962, 894,926
18 Claims. (Cl. 260—239.55)

The invention relates to a novel process for the preparation of the lactone of ω-(Δ⁴-androstene-16β-ol-3-one-16α-yl)-propionic acid having the formula

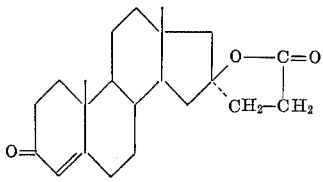

which possesses anti-aldosteronic activity and to novel intermediate products formed therein.

Prior art processes for the preparation of steroid lactones starting from unsaturated steroids with a carbonyl group in the D ring have first formed the ethynylated derivatives thereof which have to be reduced by catalytic hydrogenation during the process which reduction affects the other unsaturated portions of the steroid nucleus. The process of the invention does not require any reducing step which can effect the unsaturated portion of the steroid nucleus.

It is an object of the invention to provide a novel process for the preparation of the lactone of ω-(Δ⁴-androstene-16β-ol-3-one-16α-yl)-propionic acid.

It is another object of the invention to provide novel intermediates for the lactone of ω-(Δ⁴-androstene-16β-ol-3-one-16α-yl)-propionic acid.

These and other objects and advantages of the invention will become obvious from the following detailed description.

The novel process of the invention for the preparation of the lactone of ω-(Δ⁴-androstene-16β-ol-3-one-16α-yl)-propionic acid comprises subjecting Δ⁵-androstene-3β-ol-16-one to a Grignard reaction with a magnesium derivative of a ketonide of 1,2-dihydroxy-4-halo-butane having the formula

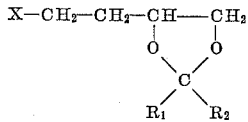

wherein $R_1$ and $R_2$ are alkyl radicals having 1 to 10 carbon atoms and X is a halogen such as bromine, iodine or chlorine to form the corresponding ketonide of 16α-(3′4′-dihydroxybutyl)-Δ⁵-androstene-3β, 16β-diol, hydrolyzing the latter under acidic conditions to form 16α-(3′,4′-dihydroxybutyl)-Δ⁵-androstene-3β, 16β-diol, simultaneously degrading and cyclizing the lateral chain of the latter with periodic acid to form 1′,16β-epoxy-16α-(1′ξ-hydroxypropyl)-Δ⁵-androstene-3β-ol, etherifying the latter with a lower alkanol to form 1′,16β-epoxy-16α-(1′ξ-alkoxypropyl)-Δ⁵-androstene-3β-ol, oxidizing the latter to form 1′,16β-epoxy-16α-(1′ξ-alkoxypropyl)-Δ⁴-androstene-3-one, transetherifying the latter under acidic conditions to form the 1′ξ,1′ξ-ether oxide of 1′,16β-epoxy-16α-(1′ξ-hydroxypropyl)-Δ⁴-androstene-3-one and oxidizing the latter to form the lactone of ω-(Δ⁴-androstene-16β-ol-3-one-16α-yl)-propionic acid.

As a variation of the process, 16α-(3′,4′-dihydroxybutyl)-Δ⁵-androstene-3β,16β-diol can be reacted with periodic acid in methanol to form directly 1′,16β-epoxy-16α-(1′ξ-methoxypropyl)-Δ⁵-androstene-3β-ol.

A preferred mode of the process of the invention for the preparation of the lactone of ω-(Δ⁴-androstene-16β-ol-3-one-16α-yl)-propionic acid comprises reacting Δ⁵-androstene-3β-ol-16-one with a magnesium derivative of 1,2-isopropylidenedioxy-4-bromo-butane in an inert organic solvent, such as a mixture of ethyl ether and benzene to form the acetonide of 16α-(3′,4′-dihydroxybutyl)-Δ⁵-androstene-3β,16β-diol, hydrolyzing the latter with a mineral acid, such as hydrochloric acid to form 16α-(3′,4′-dihydroxybutyl)-Δ⁵-androstene-3β,16β-diol, simultaneously degrading and cyclizing the lateral chain of the latter with periodic acid in the presence of an alkali metal hydroxide, such as sodium hydroxide in tert.-butanol to form 1′,16β-epoxy-16α-(1′ξ-hydroxypropyl) - Δ⁵ - androstene-3β-ol, etherifying the latter with methanol in the presence of sulfuric acid to form 1′,16β-epoxy-16α-(1′ξ-methoxypropyl)-Δ⁵-androstene-3β-ol, oxidizing the latter with aluminum isopropylate in an inert organic solvent, such as toluene to form 1′,16β-epoxy-16α-(1′ξ-methoxypropyl)-Δ⁴-androstene-3-one, then etherifying the latter in the presence of sulfuric acid in tert.-butanol to form the 1′ξ,1′ξ-ether oxide of 1′,16β-epoxy-16α-(1′ξ-hydroxypropyl)-Δ⁴-androstene-3-one and oxidizing the latter with a mixture of chromic acid and sulfuric acid in aqueous acetone to form the lactone of ω-(Δ⁴-androstene-16β-ol-3-one-16α-yl)-propionic acid.

The oxidation of the 1′ξ,1′ξ-ether oxide, of 1′,16β-epoxy-16α-(1′ξ-hydroxy propyl)-Δ⁴-androstene-3-one with a mixture of chromic acid and sulfuric acid in aqueous acetone proceeds through the intermediate, 1′,16β-epoxy-16α - (1′ξ - hydroxypropyl)-Δ⁴-androstene-3-one which is immediately oxidized to the lactone of ω-(Δ⁴-androstene-16β-ol-3-one-16α-yl)-propionic acid. If desired, the said intermediate can be isolated by reacting the said 1′ξ,1′ξ-ether oxide under acidic hydrolysis conditions, such as aqueous acetic acid at room temperature to form 1′,16β-epoxy-16α-(1′ξ-hydroxypropyl)-Δ⁴-androstene-3-one.

The 1′ξ,1′ξ-ether oxide of 1′,16β-epoxy-16α-(1′ξ-hydroxypropyl)-Δ⁵-androstene-3β-ol can be prepared by reacting 1′,16β - epoxy - 16α - (1′ξ-methoxypropyl)-Δ⁵-androstene-3β-ol with a solution of hydrochloric acid in aqueous acetone.

1′,16β - epoxy - 16α-(1′ξ-ethoxypropyl)-Δ⁵-androstene-3β-ol can be prepared by reacting 1′,16β-epoxy-16α-(1′ξ-methoxypropyl)-Δ⁵-androstene-3β-ol with sulfuric acid in aqueous ethanol or by reacting 1′,16β-epoxy-16α-(1′ξ-hydroxypropyl)-Δ⁵-androstene-3β-ol with ethanol in the presence of sulfuric acid.

The 3-enamino derivatives of 1′,16β-epoxy-16α-(1′ξ-methoxypropyl)-Δ⁴-androstene-3-one can be prepared by reacting the said product with a secondary amine, such as dilower alkyl amine, pyrrolidine, piperidine or morpholine. For example, 3-pyrrolidyl-1′,16β-epoxy-16α-(1′ξ-methoxypropyl)-Δ⁴-androstene-3-one can be prepared by reacting 1′,16β-epoxy-16α-(1′ξ-methoxypropyl)-Δ⁴-androstene-3-one with pyrrolidine in methanol.

The process of the invention is schematically illustrated in Table I.

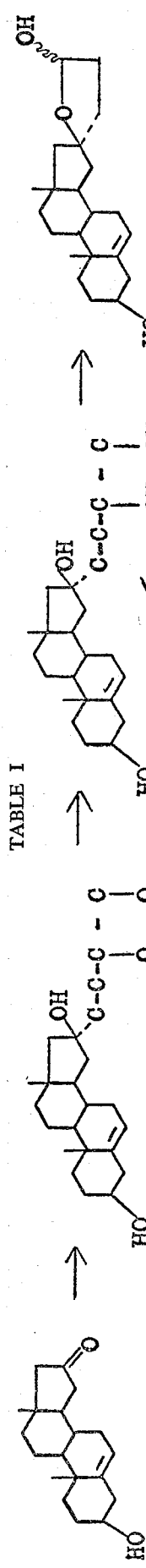
wherein $R_1$ and $R_2$ are alkyl radicals having 1 to 10 carbon atoms The designation of "1'ξ-" is intended to indicate that the product occurs in the form of two epimers which may be isolated by the usual methods if desired. Epimer A is the epimer having the lower rotatory power while epimer B is the epimer having the higher rotatory power.

The ketonides of 1,2-dihydroxy-4-halo-butane can be produced by the process described in the commonly assigned, copending U.S. application Serial No. 272,230, filed on even date herewith. The said process comprises reacting 1,2,4-trihydroxy-butane with a dialkyl ketone in the presence of an acid to form the 1,2-ketonide of 1,2,4-trihydroxy butane, forming a sulfonic acid ester of the said ketonide and reacting the latter with an alkali metal halide.

In the following examples there are described several preferred embodiments to illustrate the invention. However, it should be understood that the invention is not intended to be limited to the specific embodiments.

EXAMPLE I

*Preparation of 1,2-isopropylidenedioxy-4-bromo-butane*

*Step A.—Preparation of 1,2-isopropylidenedioxy-4-hydroxy-butane.*—A mixture of 250 gm. of 1,2,4-trihydroxy-butane, 3 liters of acetone and 25 cc. of 65% perchloric acid was prepared and was allowed to stand at room temperature for about 2 hours under a nitrogen atmosphere with agitation. 65 gm. of sodium carbonate were added and the agitation was continued for another hour. The reaction mixture was filtered and 1.5 cc. of triethylamine were added to the filtrate. The acetone was then removed under slight vacuum and the solution was distilled under a vacuum of 20 mm. Hg. 252 gm. of 1,2-isopropylidenedioxy-4-hydroxy-butane distilling at 107–109° C. (20 mm. Hg) were recovered. The product had a boiling point of 207° C. at 760 mm. Hg and an index of refraction $n_D^{20}=1.439$.

The product was soluble in alcohol and acetone, insoluble in water and dilute aqueous alkalis while dilute aqueous acids decomposed it.

*Step B—Preparation of the mesylate of 1,2-isopropylidenedioxy-4-hydroxy-butane.*—100 gm. of 1,2-isopropylidenedioxy-4-hydroxy-butane were dissolved in 125 cc. of pyridine. The solution was cooled to −40° C. and slowly 54 cc. of mesyl chloride were introduced. Then the temperature was allowed to rise to between −10 and −5° C. and the reaction mixture was agitated for a period of 2 hours. Next the temperature was allowed to return to room temperature and the reaction mixture was added to water. The mixture was extracted with ether and the extract was successively washed with a solution of sodium bicarbonate, a normal solution of sodium hydroxide and allowed to stand overnight under agitation with a solution of sodium bicarbonate in the presence of triethylamine. The ethereal extract was then washed with a saturated salt solution, dried over magnesium sulfate, concentrated under nitrogen and 140 gm. of liquid mesylate of 1,2-isopropylidenedioxy - 4-hydroxy-butane were obtained.

This compound was soluble in chloroform and insoluble in water and dilute aqueous alkalis while dilute aqueous acids decomposed it.

In a similar fashion, 1,2-isopropylidenedioxy - 4-hydroxy-butane could be reacted with acetic acid anhydride in pyridine to form the liquid acetate of 1,2-isopropylidene-dioxy-4-hydroxy-butane having a boiling point of 205° C. at 760 mm. Hg and an index of refraction $n_D^{20}=1.430$.

The product was soluble in chloroform, slightly soluble in ether and insoluble in water and dilute aqueous alkali while dilute aqueous acids decomposed it.

*Step C—Preparation of 1,2-isopropylidenedioxy-4-bromo-butane.*—280 gm. of lithium bromide were introduced into 1,400 cc. of acetone and 140 gm. of the mesylate of 1,2-isopropylidenedioxy-4-hydroxy-butane and 7.5 cc. of triethylamine were added. The reaction mixture was heated to reflux under agitation for a period of about 5 hours. After 1,500 cc. of water were added, the organic phase was separated and the hydro-acetonic phase was extracted with ether. The ethereal extract was dried and concentrated under nitrogen. The residue from the ethereal extract was added to the organic phase and the solution was allowed to stand over potassium carbonate in the presence of triethylamine. Then the solution was filtered, distilled under vacuum in order to obtain 55 gm. of 1,2-isopropylidenedioxy-4-bromo-butane having a boiling point (under 18–19 mm. Hg) of 89–90° C. and an index of refraction $n_D^{22}=1.462$.

The product was soluble in acetone and chloroform and insoluble in water and dilute aqueous alkalis while dilute aqueous acids decomposed it.

*Analysis*—$C_7H_{13}O_2Br$; molecular weight=209.09. Calculated: C, 40.20%; H, 6.26%; Br, 38.22%. Found: C, 40.3%; H, 6.1%; Br, 37.9%.

1,2-isopropylidenedioxy-4-bromo-butane could be easily hydrolyzed, if desired, by the action of an acid, such as hydrochloric acid to obtain 1,2-dihydroxy-4-bromo-butane having an index of refraction $n_D^{26}=1.475$. This product was soluble in chloroform, alcohol and water.

EXAMPLE II

*Preparation of the lactone of ω-(Δ-androstene-16β-ol-3-one-16α-yl)-propionic acid*

*Step A—Preparation of the acetonide of 16α-(3',4'-dihydroxybutyl)-Δ⁵-androstene - 3β,16β-diol.*—8.5 gm. of magnesium were introduced into 35 cc. of ether under an atmosphere of nitrogen and under agitation. Then 1 cc. of 1,2-isopropylidenedioxy - 4-bromo-butane was added and when refluxing started, a solution of 53 gm. of 1,2-isopropylidenedioxy-4-bromo-butane in 85 cc. of ether and a solution of 10 gm. of Δ⁵-androstene-3β-ol-16-one in 120 cc. of benzene were introduced slowly and simultaneously for a period of about one and a half hours. The reaction mixture was allowed to stand overnight under agitation at room temperature and then 100 cc. of a saturated solution of ammonium chloride containing 10% ammonia were added under agitation. The organic phase was separated and the aqueous phase was extracted with ether. The extract was combined with the organic phase and the organic solution was dried and concentrated. The oily residue was taken up with petroleum ether, iced and the petroleum ether was decanted. Then the residue was taken up in either and dried to obtain 13.6 gm. of the raw acetonide of 16α-(3',4'-dihydroxybutyl)-Δ⁵-androstene-3β,16β-diol. This product was employed as such for the next step of the synthesis.

This compound is not described in the literature.

*Step B—Preparation of 16α-(3',4'-dihydroxybutyl)-Δ⁵-androstene-3β,16β-diol.*—All of the raw acetonide of 16α-(3',4'-dihydroxybutyl)-Δ⁵-androstene-3β,16β-diol obtained in the preceding step was dissolved in a mixture of 68 cc. of ethanol, 34 cc. of water and 1 cc. of concentrated hydrochloric acid, and the solution was maintained for a period of one and a half hours under agitation at room temperature. Thereafter it was poured into water and the aqueous solution was extracted with a mixture of chloroform containing 20% of butanol. The extract was washed with water, dried and concentrated.

The residue was taken up with methylene chloride, triturated at reflux under agitation, cooled and vacuum filtered. The crystals were washed by trituration with methylene chloride and dried to obtain raw 16α-(3',4'-dihydroxybutyl)-Δ⁵-androstene-3β,16β-diol which was dissolved at reflux in 70 cc. of aqueous isopropanol. The hot solution was filtered, added to benzene and allowed to crystallize. The crystals formed were vacuum filtered, washed with isopropanol and with water and dried. 5.04 gm. of 16α-(3',4'-dihydroxybutyl)-Δ⁵-androstene-3β,16β-diol having a melting point of 193–194° C. and a specific rotation $[\alpha]_D^{20}=53°$ (c.=0.6% in aqueous dioxane) were obtained. A second lot of 2.9 gm. of product was obtained from the mother liquors.

This compound was slightly soluble in alcohol, insoluble in water, dilute aqueous alkalis, ether and chloroform.

*Analysis.*—$C_{23}H_{38}O_4$; molecular weight=378.53. Calculated: C, 72.97%; H, 10.12%. Found: C, 72.5%; H, 9.9%.

This compound is not described in the literature.

The starting compound, $\Delta^5$-androstene-3β-ol-16-one, was prepared according to the method described by F. Fajkos et al., Chem. Listy. 47, 1207 (1953).

*Step C.—Preparation of 1',16β-epoxy-16α-(1'ξ-hydroxypropyl)-$\Delta^5$-androstene-3β-ol.*—200 mg. of 16α-(3',4'-dihydroxybutyl)-$\Delta^5$-androstene-3β,16β-diol were dissolved in 20 cc. of tert.-butanol. Separately, 400 mg. of periodic acid in 20 cc. of distilled water were prepared which was brought to a pH of 4 by the addition of about 1.8 cc. of N sodium hydroxide. The second solution was added to the first under agitation and the mixture was allowed to remain at rest for a period of about two hours at room temperature. The reaction solution was then diluted with water and extracted with chloroform. The organic solution was separated, washed with water, dried and concentrated. The residue was taken up with a little bit of methylene chloride. The methylene chloride was distilled while adding ether and the crystals formed were then vacuum filtered and dried to obtain 135 mg. of raw 1',16β-epoxy-16α-(1'ξ-hydroxypropyl) - $\Delta^5$ - androstene-3β-ol which was dissolved in tetrahydrofuran. The solution was filtered and concentrated. Then benzene was added thereto and the solution was allowed to stand for crystallization to obtain 58 mg. of 1',16β-epoxy-16α-(1'ξ-hydroxypropyl)-$\Delta^5$-androstene-3β-ol having a melting point of 213–214° C. and a specific rotation $[\alpha]_D^{20}=$ −78° (c.=1% in dioxane).

The product was soluble in tetrahydrofuran, slightly soluble in ether, benzene and chloroform, and insoluble in water and dilute aqueous acids and alkalis. It occurred in the form of a mixture of A and B epimers.

*Analysis.*—$C_{22}H_{34}O_3$; molecular weight=346.49. Calculated: C, 76.25%; H, 9.89%. Found: C, 76.0%; H, 10.0%.

This compound is not described in the literature.

*Step D.—Preparation of 1',16β-epoxy-16α-(1'ξ-methoxypropyl)-$\Delta^5$-androstene-3β-ol.*—50 mg. of 1',16β-epoxy-16α(1'ξ-hydroxypropyl)-$\Delta^5$-androstene - 3β-ol were placed in suspension in 2.5 cc. of methanol and 0.05 cc of normal sulfuric acid. The suspension was heated to reflux for a period of an hour and a half and after several milliliters of water were added, the mixture was allowed to stand for crystallization under cooling. The crystals formed were vacuum filtered, washed with water and dried. 50 mg. of raw 1',16β-epoxy-16β-(1'ξ-methoxypropyl)-$\Delta^5$-androstene-3β-ol were obtained which upon recrystallization from methanol had a melting point of about 208° C. and then more than 250° C. and a specific rotation $[\alpha]_D^{20}=+8.5°\pm2°$ (c.=0.7% in dioxane).

This compound was soluble in benzene and chloroform, slightly soluble in alcohol and insoluble in water. It occurred in the form of the A epimer.

*Analysis.*—$C_{23}H_{36}O_3$; molecular weight=360.52. Calculated: C, 76.62%; H, 10.06%. Found: C, 76.5%; H, 10.0%.

This compound is not described in the literature.

1',16β-epoxy-16α - (1'ξ - methoxyproply) - $\Delta^5$ - androstene-3β-ol was also obtained directly starting from 16α-(3',4'-dihydroxybutyl)-$\Delta^5$-androstene-3β,16β-diol by the degradation and the cyclization of the lateral chain by the action of periodic acid in methanol.

Upon suspending 1',16β - epoxy-16α - (-'ξ-methoxypropyl)-$\Delta^5$-androstene-3β-ol in a mixture of acetone and normal hydrochloric acid and agitating the said suspension for about 30 minutes to effect dissolution, the 1'ξ,1'ξ-ether oxide of 1',16β-epoxy-16α-(1'ξ-hydroxypropyl)-$\Delta^5$-androstene-3β-ol crystallized upon standing of the solution at room temperature under agitation which upon recrystallization from benzene had a melting point of 272° C. and a specific rotation $[\alpha]_D^{20}=+12°\pm4°$ (c.=0.25% in dioxane).

This product was slightly soluble in acetone, benzene and chloroform and insoluble in water and dilute aqueous acids and alkalis. It occurred in the form of a mixture of A and B epimers.

*Analysis.*—$C_{44}H_{66}O_5$; molecular weight=674.96. Calculated: C, 78.29%; H, 9.85%. Found: C, 78.1%; H, 9.8%.

This compound is not described in the literature.

*Step E—Preparation of 1',16β-epoxy-16α-(1'ξ-methoxypropyl)-$\Delta^4$-androstene-3-one.*—470 mg. of 1',16β-epoxy-16α-(1'ξ-methoxypropyl)-$\Delta^5$-androstene-3β-ol were dissolved under nitrogen in 20 cc. of toluene and after 7.5 cc. of the solvent was distilled therefrom, 5 cc. of cyclohexanone were added. A solution of 0.5 gm. of aluminum isopropylate in 10 cc. of toluene was then introduced slowly over a period of 45 minutes while distilling 6 cc. of the solvent therefrom. Next 10 cc. of toluene were introduced and the distillation was continued to distill 9 cc. therefrom. Then 20 cc. of the saturated solution of the double salt of sodium and potassium tartrate were added thereto and the mixture was subjected to a steam distillation. Then the reaction mixture was extracted with ether and the ethereal extract was washed with water, dried and concentrated. The product was taken up with isopropyl ether and a chromatography was effected over magnesium silicate with elution with methylene chloride and the eluate was crystallized. 400 mg. of raw 1',16β-epoxy-(1'ξ-methoxypropyl)-$\Delta^4$-androstene-3-one were obtained which was taken up by methylene chloride. The solution was concentrated, added to hexane, the methylene chloride evaporated and the product was allowed to crystallize to obtain 1',16β-epoxy-16α-(1'ξ-methoxypropyl)-$\Delta^4$-androstene-3-one whose melting point was 120° C. and whose specific rotation was $[\alpha]_D^{20}=+116°$ (c.=0.6% in dioxane).

This product was soluble in chloroform, slightly soluble in hexane, and insoluble in water and dilute aqueous acids and alkalis. It occurred in the form of the B epimer.

*Analysis.*—$C_{23}H_{34}O_3$; molecular weight=358.50. Calculated: C, 77.05%; H, 9.56%. Found: C, 77.0%; H, 9.6%.

This compound is not described in the literature.

By reacting 1',16β-epoxy-16α-(1'ξ-methoxypropyl)-$\Delta^4$-androstene-3-one with pyrrolidine in methanol, 3-pyrrolidyl - 1',16β-epoxy-16α-(1'ξ-methoxypropyl)-$\Delta^{3,5}$-androstadiene having a melting point of 152° C. was obtained. This product was soluble in benzene and chloroform and insoluble in alcohols while dilute aqueous acids decompose it. It occurred in the form of a mixture of the A and B epimers.

This compound is not described in the literature.

*Step F—Prepartion of the 1'ξ,1'ξ-ether oxide of 1',16β-epoxy-16α-(1'ξ-hydroxypropyl)-$\Delta^4$-androstene - 3 - one.*—500 mg. of 1',16β-epoxy-16α-(1'ξ-methoxypropyl)-$\Delta^4$-androstene-3-one were placed in suspension in a mixture of 3 cc. of tert.-butanol and 3 cc. of water and the suspension was heated to reflux. 0.25 cc. of a normal solution of sulfuric acid was added and the reflux was maintained for a period of about one hour. The reaction mixture was then cooled by an ice bath and 3 cc. of water were added. The precipitate formed was vacuum filtered, washed with water and dried. 228 mg. of raw 1'ξ,1'ξ-ether oxide of 1',16β-epoxy-16α-(1'ξ-hydroxypropyl)-$\Delta^4$-androstene-3-one were obtained which was purified by dissolution in methylene chloride, concentration in the presence of aqueous dimethylformamide and crystallization. The crystals formed were cooled and vacuum filtered to obtain the 1'ξ,1'ξ-ether oxide of 1', 16β-epoxy-16α-

(1'ξ-hydroxypropyl)-Δ⁴-androstene-3-one having a melting point of 329° C. and a specific rotation [α]_D²⁰=+140.5° (c.=0.4% in chloroform).

The product was soluble in benzene and chloroform, slightly soluble in ether, very slightly soluble in tert.-butanol and insoluble in water. It occurred in the form of a mixture of A and B epimers.

*Analysis.*—C₄₄H₆₂O₅; molecular weight=670.94. Calculated: C, 78.76%; H, 9.31%. Found, C, 78.8%, H, 9.3%.

This compound is not described in the literature.

By treating the 1'ξ,1'ξ-ether oxide of 1',16β-epoxy-16α-(1'ξ-hydroxypropyl)-Δ⁴-androstene-3-one with aqueous acetic acid at room temperature, 1',16β-epoxy-16α-(1'ξ-hydroxypropyl)-Δ⁴-androstene-3-one was obtained which is identical to the same product in copending U.S. application Serial No. 272,224 filed on even date herewith. The product occurred in the form of the mixture of A and B epimers.

*Step G—Preparation of the lactone of ω-(Δ⁴-androstene-16β-ol-3-one-16α-yl)-propionate acid.*—160 mg. of the 1'ξ,1'ξ-ether oxide of 1',16β-epoxy-16α-(1'ξ-hydroxypropyl)-Δ⁴-androstene-3-one were placed in suspension in 11 cc. of acetone and 4 cc. of water. The suspension was subjected to agitation at room temperature and 0.15 cc. of a sulfochromic acid solution consisting of 135 gm. of chromic acid, 115 cc. of sulfuric acid, 4 cc. of acetic acid and sufficient water to make 500 cc. of solution was added. The agitation was maintained for a period of two hours at room temperature and then the excess of the oxidant was destroyed with 0.5 cc. of methanol. The reaction mixture was then poured into water and the precipitate was extracted with ether. The ethereal extract was washed successively with water, with a solution of sodium bicarbonate and with water, dried and concentrated. The residue was taken up with ether and crystallized. The crystals formed were vacuum filtered and dried. 95 mg. of raw lactone of ω-(Δ⁴-androstene-16β-ol-3-one-16α-yl)-propionic acid were obtained which was purified by recrystallization by heating and cooling in a mixture of benzene and isopropyl ether. The purified product had a melting point of 168° C. and a specific rotation [α]_D²⁰=+39° (c.=0.5% in dioxane).

The product was soluble in alcohols, acetone, benzene and chloroform, slightly soluble in ether and insoluble in water and dilute aqueous acids and alkalis and was identical to the same product obtained in commonly assigned, copending U.S. application Serial No. 272,224.

*Analysis.*—C₂₂H₃₀O₃; molecular weight=342.46. Calculated: C, 77.15%; H, 8.83%. Found: C, 76.9%; H 8.8%.

EXAMPLE III

*Preparation of 1',16β-epoxy-16α-(1'ξ-ethoxypropyl)-Δ⁵-androstene-3β-ol*

1',16β-epoxy-16α-(1'ξ-methoxypropyl)-Δ⁵-androstene-3β-ol produced in Step D of Example II was reacted with sulfuric acid in aqueous ethanol to obtain 1',16β-epoxy-16α-(1'ξ-ethoxypropyl)-Δ⁵-androstene-3β-ol having a melting point of 173° C. and a specific rotation $$[\alpha]_D^{20}=4.5°\pm 2°$$

(c.=0.8% in dioxane).

This product which occurred in the form of a mixture of A and B epimers was soluble in chloroform, slightly soluble in benzene and insoluble in water.

*Analysis.*—C₂₄H₃₈O₃; molecular weight=374.54. Calculated: C, 76.96%; H, 10.22%. Found: C, 76.8%; H, 10.1%.

1',16β - epoxy - 16α-(1'ξ-ethoxypropyl)-Δ⁵-androstene-3β-ol could also be obtained by reacting 1',16β-epoxy-16α-(1'ξ-hydroxypropyl)-Δ⁵-androstene-3β-ol produced in Step C of Example II with ethanol in the presence of a mineral acid, such as sulfuric acid.

This compound is not described in the literature.

Various modifications of the process of the invention may be made without departing from the spirit or scope thereof, and it is to be understood that the invention is intended to be limited only as defined in the appended claims.

We claim:
1. A process for the preparation of the lactone of ω-(Δ⁴-androstene-16β-ol-3-one-16α-yl)-propionic acid which comprises reacting Δ⁵-androstene-3β-ol-16-one with a magnesium derivative of a ketonide of 1,2-dihydroxy-4-halo-butane having the formula

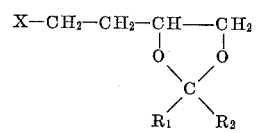

wherein R₁ and R₂ are alkyl radicals having 1 to 10 carbon atoms and X is a halogen to form the corresponding ketonide of 16α-(3',4'-dihydroxybutyl)-Δ⁵-androstene-3β,16β-diol, hydrolyzing the latter under acidic conditions to form 16α-(3',4'-dihydroxybutyl)-Δ⁵-androstene-3β,16β-diol, reacting the latter with periodic acid to simultaneously degrade and cyclize the lateral chain to form 1',16β-epoxy-16α-(1'ξ-hydroxypropyl)-Δ⁵-androstene-3β-ol, reacting the latter with a lower alkanol to form 1',16β-epoxy-16α-(1'ξ-alkoxypropyl)-Δ⁵-androstene-3β-ol, oxidizing the latter to form 1',16β-epoxy-16α-(1'ξ-alkoxypropyl)-Δ⁴-androstene-3-one, reacting the latter under acidic conditions to form the 1'ξ,1'ξ-ether oxide of 1',16β-epoxy-16α-(1'ξ-hydroxypropyl)-Δ⁴-androstene-3-one and oxidizing the latter to form the lactone of ω-(Δ⁴-androstene-16β-ol-3-one-16α-yl)-propionic acid.

2. The process of claim 1 wherein the ketonide of 1,2-dihydroxy-4-halo-butane is 1,2-isopropylidenedioxy-4-bromo-butane.

3. The process of claim 1 wherein the hydrolysis of the ketonide of 16α-(3',4'-dihydroxybutyl)-Δ⁵-androstene-3β,16β-diol is effected in the presence of hydrochloric acid.

4. The process of claim 1 wherein the degradation and cyclization of the lateral chain is effected with periodic acid in the presence of sodium hydroxide in tert.-butanol.

5. The process of claim 1 wherein 1',16β-epoxy-16α-(1'ξ-hydroxypropyl)-Δ⁵-androstene-3β-ol is reacted with methanol in the presence of sulfuric acid.

6. The process of claim 1 wherein the oxidation of 1',16β-epoxy-16α-(1'ξ-alkoxypropyl)-Δ⁵-androstene-3β-ol is effected wiht aluminum isopropylate in toluene.

7. The process of claim 1 wherein the transetherification of 1',16β-epoxy-16α-(1'ξ-alkoxypropyl)-Δ⁴-androstene-3-one is effected with sulfuric acid in aqueous tert.-butanol.

8. The process of claim 1 wherein the oxidation of the 1'ξ,1'ξ-ether oxide of 1',16β-epoxy-16α-(1'ξ-hydroxypropyl)-Δ⁴-androstene-3-one is effected with a mixture of sulfuric acid and chromic acid in aqueous acetone.

9. A process for the preparation of the lactone of ω - (Δ⁴ - androstene-16β-ol-3-one-16α-yl)-propionic acid which comprises reacting Δ⁵-androstene-3β-ol-16-one with a magnesium derivative of 1,2-isopropylidenedioxy-4-bromo-butane to form the acetonide of 16α-(3',4'-dihydroxybutyl)-Δ⁵-androstene-3β,16β-diol, hydrolyzing the latter under acidic conditions to form 16α-(3',4'-dihydroxybutyl)-Δ⁵-androstene-3β,16β-diol, reacting the latter with periodic acid in the presence of sodium hydroxide in tert.-butanol to form 1',16β-epoxy-16α(1'ξ-hydroxypropyl)-Δ5-androstene-3β-ol, reacting the latter with methanol in the presence of sulfuric acid to form 1',16β-epoxy-16α-(1'ξ-methoxypropyl)-Δ5-androstene-3β-ol, oxidizing the latter with aluminum isopropylate in an inert solvent to form 1',16β-epoxy-16α-(1'ξ-methoxypropyl)-Δ4-androstene-3-one, reacting the latter with sulfuric acid to form the 1'ξ,1'ξ-ether oxide of 1',16β-epoxy-16α-(1'ξ-hydroxypropyl)-Δ4-androstene-3-one, and oxidizing the latter with a mixture of sulfuric acid and chromic acid in aqueous acetone to form the lactone of ω-(Δ4-androstene-16β-ol-3-one-16α-yl)-propionic acid.

10. A process for the preparation of the lactone of ω-(Δ4-androstene-16β-ol-3-one-16α-yl)-propionic acid which comprises reacting Δ5-androstene-3β-ol-16-one with a magnesium derivative of 1,2-isopropylidenedioxy-4-bromo-butane to form the acetonide of 16α-(3',4'-dihydroxybutyl)-Δ5-androstene-3β,16β-diol, hydrolyzing the latter under acidic conditions to form 16α-(3',4'-dihydroxybutyl)-Δ5-androstene-3β,16β-diol, reacting the latter with periodic acid in methanol to form 1',16β-epoxy-16α-(1'ξ-methoxypropyl)-Δ5-androstene-3β-ol, oxidizing the latter with aluminum isopropylate in an inert solvent to form 1',16β-epoxy-16α(1'ξ-methoxypropyl)-Δ4-androstene-3-one, reacting the latter with sulfuric acid to form the 1'ξ,1'ξ-ether oxide of 1',16β-epoxy-16α-(1'ξ-hydroxypropyl)-Δ4-androstene-3-one, and oxidizing the latter with a mixture of sulfuric acid and chromic acid in aqueous acetone to form the lactone of ω-(Δ4-androstene-16β-ol-3-one-16α-yl)-propionic acid.

11. A compound having the formula

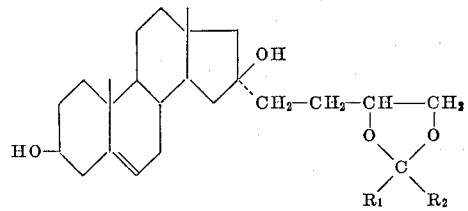

wherein $R_1$ and $R_2$ are alkyl radicals having 1 to 10 carbon atoms.

12. The acetonide of 16α-(3',4'-dihydroxybutyl)-Δ5-androstene-3β,16β-diol.

13. 16α-(3',4'-dihydroxybutyl)-Δ5-androstene-3β,16β-diol.

14. 1',16β-epoxy-16α-(1'ξ-hydroxpyropyl)Δ5-androstene-3β-ol.

15. 1',16β-epoxy-16α-(1'ξ-ethoxypropyl)-Δ5-androstene-3β-ol.

16. 1',16β-epoxy-16α-(1'ξ-methoxypropyl)-Δ5-androstene-3β-ol.

17. 1',16β-epoxy-16α-(1'ξ-methoxypropyl)-Δ4-androstene-3-one.

18. The 1'ξ,1'ξ-ether oxide of 1',16β-epoxy-16α-(1'ξ-hydroxypropyl)-Δ4-androstene-3-one.

No references cited.

LEWIS GOTTS, *Primary Examiner.*
THOMAS M. MESHBESHER, *Assistant Examiner.*